May 5, 1931.  A. E. WILSON  1,804,192
AUTOMATIC PUMP
Filed Dec. 5, 1927

Inventor.
Archibald E. Wilson.
by
H. J. S. Dennison
atty.

Patented May 5, 1931

1,804,192

UNITED STATES PATENT OFFICE

ARCHIBALD EDGAR WILSON, OF TORONTO, ONTARIO, CANADA, ASSIGNOR OF ONE-HALF TO HOWARD C. HOOPS, OF TORONTO, CANADA

AUTOMATIC PUMP

Application filed December 5, 1927. Serial No. 237,812.

The principal objects of the invention are, to preserve the life of automobile or other vehicle tires by maintaining them under a uniform pressure, and to devise a very simple and reliable pump structure which may be incorporated in the automobile wheel.

The principal features of the invention consist in the novel arrangement of a pump cylinder and piston within a rotating wheel co-operating with a fixed cam, whereby a reciprocating movement is imparted to the pump piston forcing air through a conduit connected to the tire valve.

Figure 1:
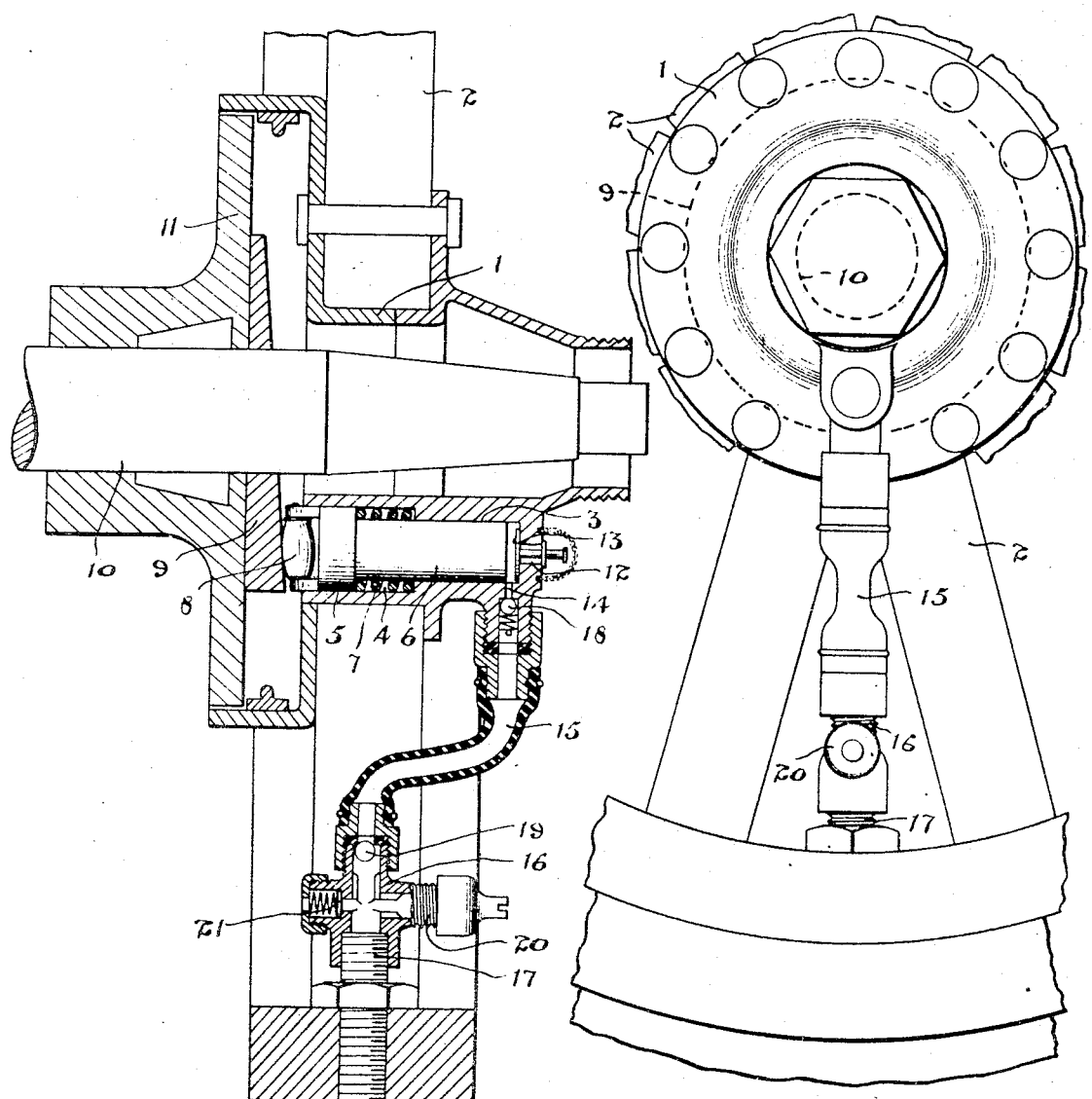

In the drawings, Figure 1 is an elevational view of the hub and a portion of a vehicle wheel showing the application of my invention thereto.

Figure 2:
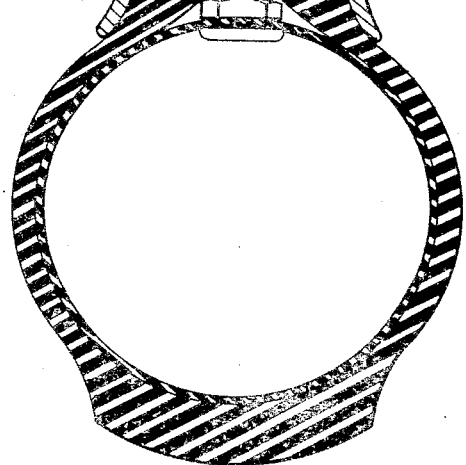

Figure 2 is a vertical mid-sectional view through the wheel hub, pump and valve mechanism.

In the form of the invention herein shown the wheel hub 1 in which the spokes 2 are secured is constructed with a cylinder 3 which is arranged parallel with the axis of the hub and an enlarged recess or counterbore 4 is arranged at the inward end of the cylinder.

The counterbore 4 may be of cylindrical form, or it may be any other desirable shape in cross section and is adapted to slidably and non-rotatably house the head end 5 of the piston 6 which extends into and operates in the cylinder 2.

A coil compression spring 7 is arranged within the counterbore between the head 5 and the inward end of the cylinder and tends to force the piston inwardly.

The inner end of the piston head is preferably provided with a roller member 8 which engages the bevelled surface of a disc cam 9 which surrounds the shaft 10 and is rigidly secured to the fixed housing 11.

The end of the piston head is maintained in constant contact with the cam by the spring 7 and as the wheel revolves a reciprocating action is imparted to said piston.

At the outward end of the cylinder 3 is arranged an intake passage 12 which is closed by a valve 13 and a discharge passage 14 opens laterally from the cylinder head and directs the discharged air through a conduit 15 to the valve head 16 connected to the tire valve 17.

A ball check valve 18 is arranged to close the discharge passage adjacent to the cylinder head and a ball check valve 19 is arranged at the top end of the valve head 16.

The valve head is preferably provided with a lateral extension 20 which is provided with an ordinary type of inlet valve and is adapted for use with the ordinary air pump, if such may any time be required.

A relief valve 21 is arranged in the valve head 16 and is adapted to prevent the overcharging of the tire through the operation of either the automatic pump or through pressure applied through the valve connection 20.

It will be seen that a device such as described is extremely simple and inexpensive to incorporate into the hub structure of a car and it may be applied to both back and front wheels with equal facility.

The flat disc cam 9 can be arranged inside the hub structure without interfering with any of the ordinary working parts and the operation of the pump is positive, its lubrication being effected by the lubrication of the wheel bearings.

The cost of installation is extremely low and it will ensure the maintenance of the tires of a vehicle at a uniform pressure, thereby greatly enhancing the life of the tires.

The use of such a device also relieves the car owner from the onerous task of testing and pumping up tires from time to time.

What I claim as my invention is:—

1. In an automobile, the combination with a wheel thereof having a brake drum and a disc closing the open side of said brake drum, of a pump cylinder carried by said wheel opening into said brake drum, a cam ring encircling the wheel axis within said brake drum and fixed to said disc and presenting its cam face toward said drum, and a piston reciprocably mounted in said cylinder and operatively engaging said cam ring, said drum and disc forming a protective enclosure for said cam ring and the engaging portion of said piston.

2. In an automobile, the combination with an axle having a wheel mounted thereon, a pump cylinder carried by said wheel in radially spaced relation to said axle and having a piston operatively arranged therein and extending from the cylinder, and a brake drum on said wheel, of a fixed flange member arranged concentrically of said axle closing the open side of said drum and having a cam rigidly mounted thereon and enclosed by said drum and operatively engaging said piston, said drum and flange forming a protective enclosure for the cam and the engaging end of said piston.

ARCHIBALD EDGAR WILSON.